US006449032B1

(12) United States Patent
Whytock

(10) Patent No.: US 6,449,032 B1
(45) Date of Patent: Sep. 10, 2002

(54) SHEET RECOGNITION SYSTEM

(75) Inventor: Alexander W. Whytock, Perthshire (GB)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/231,496

(22) Filed: Jan. 14, 1999

(30) Foreign Application Priority Data

Feb. 13, 1998 (GB) ............................................ 9802990

(51) Int. Cl.[7] ................................................ G06K 9/74
(52) U.S. Cl. ........................................ 356/71; 356/390
(58) Field of Search ................................... 356/71, 390

(56) References Cited

U.S. PATENT DOCUMENTS

| | | | | |
|---|---|---|---|---|
| 4,433,437 A | | 2/1984 | Fantone | |
| 4,501,439 A | | 2/1985 | Antes | |
| 4,765,714 A | * | 8/1988 | Horner et al. | 359/561 |
| 5,447,335 A | * | 9/1995 | Haslop | 283/91 |

FOREIGN PATENT DOCUMENTS

| | | |
|---|---|---|
| EP | 0296924 | 12/1988 |
| EP | 0691632 | 1/1996 |
| EP | 0878780 | 11/1998 |
| WO | 9706502 | 2/1997 |

OTHER PUBLICATIONS

WPI Abstract Accession No. 97–382907/199735 & JP 9167271A (FUJI) Jun. 6, 1997.

* cited by examiner

*Primary Examiner*—Frank G. Font
*Assistant Examiner*—Roy M. Punnoose
(74) *Attorney, Agent, or Firm*—George H. Gates

(57) ABSTRACT

A system within a self-service deposit terminal is arranged to recognize different denominations of bank notes. The system scans each side of a deposited note and produces a diffraction pattern of first one side and then the other side of the note. The diffraction pattern is compared against reference matched spatial filters associated with different denominations that are loaded into a Vander Lugt optical correlator. If the diffraction pattern and the matched spatial filter match then a correlation dot is produced, and if this occurs for both sides of a note then a denomination value can be assigned to that note. Reference matched spatial filters for all denominations of notes to be expected are first produced on a recording system and stored in a storage device which the self-service deposit terminal can access.

15 Claims, 3 Drawing Sheets

SHEET RECOGNITION SYSTEM

BACKGROUND OF THE INVENTION

The present invention relates to a system for recognizing different types of sheets particularly different denominations of bank notes.

Current bank note denomination recognition systems include directly comparing scanned bank notes with stored digital images of bank notes, and also involves color, chemical and paper information. This is computationally intensive resulting in slow processing times. This is unwelcome since short transaction times and large throughput are important to the business of the financial institutions that require these systems.

SUMMARY OF THE INVENTION

It is an object of the present invention to provide a system for recognizing different types of sheets in which the above mentioned disadvantage is alleviated.

According to the present invention there is provided a system for recognizing a sheet comprising scanning means for scanning a sheet, storage means for storing a reference relating to a sheet to be recognized, and comparing means for comparing a sheet with said stored reference, characterized by means for producing a diffraction pattern from a sheet, in that the storage means stores at least one matched spatial filter, and in that the comparing means compares said diffraction pattern with the at least one stored matched spatial filter.

Also according to the invention there is provided a recording system for producing matched spatial filters for use in a system for recognizing different types of sheets, characterized by a first scanning means for scanning at least one side of a sheet, a spatial light modulator for providing an optical image of the scanned side of the sheet, light means for passing light through said spatial light modulator, focusing means for producing a diffraction pattern of the image displayed on said spatial light modulator, and a second scanning means for recording a matched spatial filter derived from said diffraction pattern.

BRIEF DESCRIPTION OF THE DRAWINGS

An embodiment of the present invention will now be described by way of example with reference to the accompanying drawings, in which.

DETAILED DESCRIPTION

Figure 1:
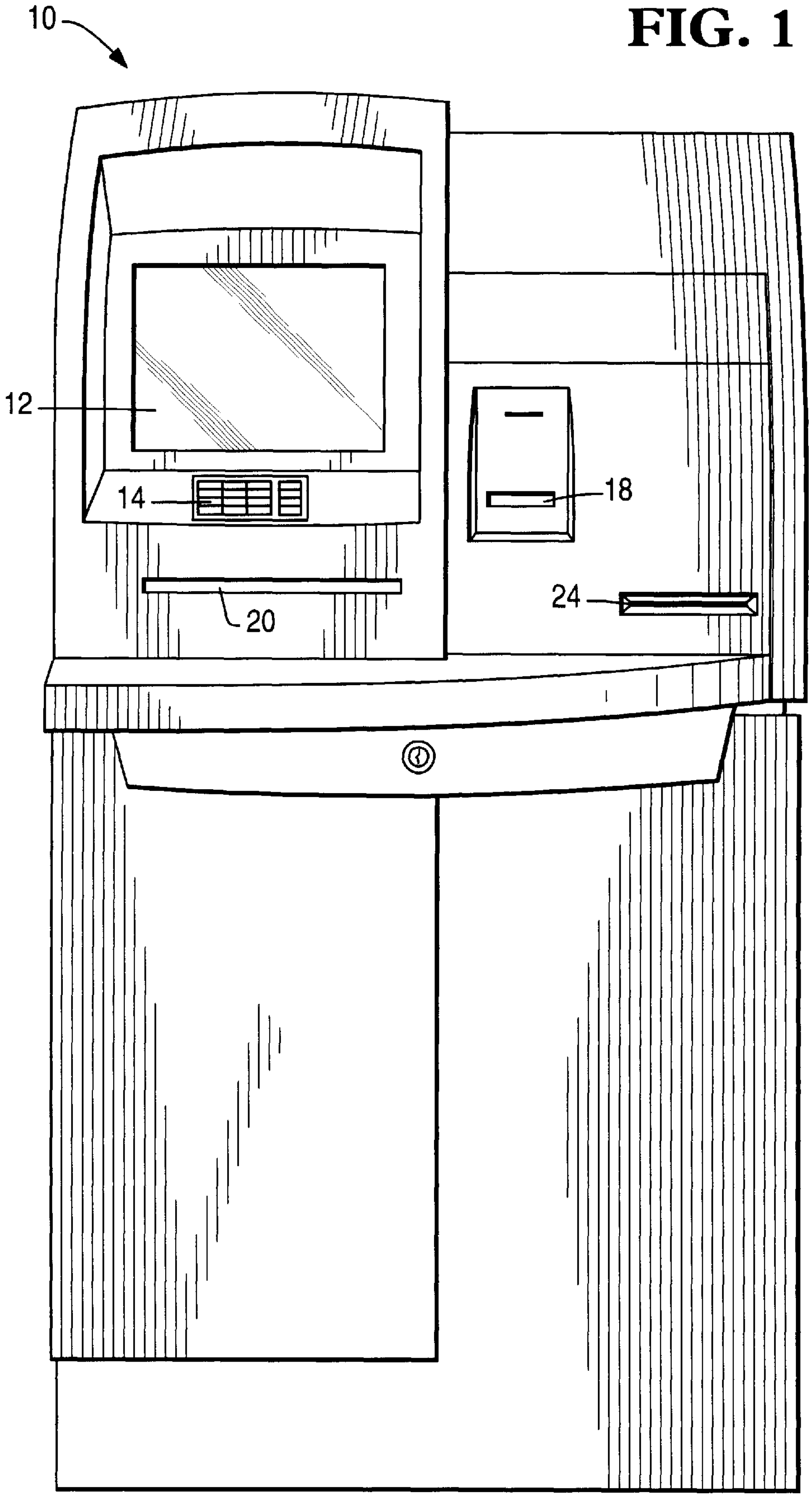
FIG. 1 is a front elevational view of a self-service deposit terminal comprising a system for recognizing different denominations of notes in accordance with the invention.
Figure 2:
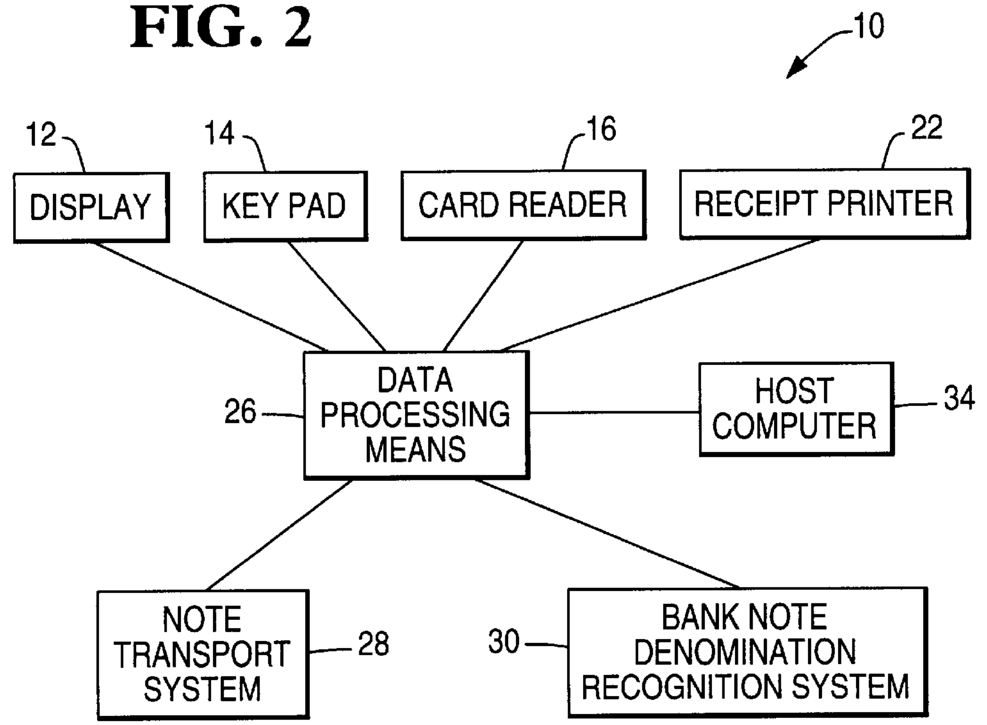
FIG. 2 is a block diagram of the deposit terminal of FIG. 1.

Referring to FIGS. 1 and 2, a self-service deposit terminal 10 comprises a display 12 for displaying user information, a key pad 14 for inputting data, a card reader 16 for receiving a user identity card via a card entry slot 18, a deposit slot 20 in which bank notes can be deposited, a receipt printer 22 for printing a receipt acknowledging a deposit made by a user and for issuing the receipt to the user via a slot 24, and data processing means 26 to which the display 12, the key pad 14, the card reader 16 and the receipt printer 22 are connected. Note transport means 28 are also connected to the data processing means 26. A system 30 for recognizing different denominations of bank notes is connected to and under the control of a control sub-system 32 (see FIG. 4) that forms part of the data processing means 26.

To make a deposit, a user inserts his identification card in the card slot 18 of the terminal. Data contained in the magnetic strip on the card is read by the card reader 16 and is transmitted by the data processing means 26 to a host computer 34. The user identifies himself by entering his personal identity number via the key pad 14. If the host computer 34 authorizes the card then the user can proceed with his deposit by first entering details of the transaction, e.g. the amount of the deposit, by means of the key pad 14, and then by depositing bank notes in the slot 18.

The deposited notes are separated by conventional means (not shown) and individually passed through the bank note denomination recognition system 30. If the note is not recognized by the system 30 as one of the expected denominations then the note is rejected. If it is recognized as a valid denomination then it is then passed through a conventional note validator (not shown) as a further check.

Figure 3:
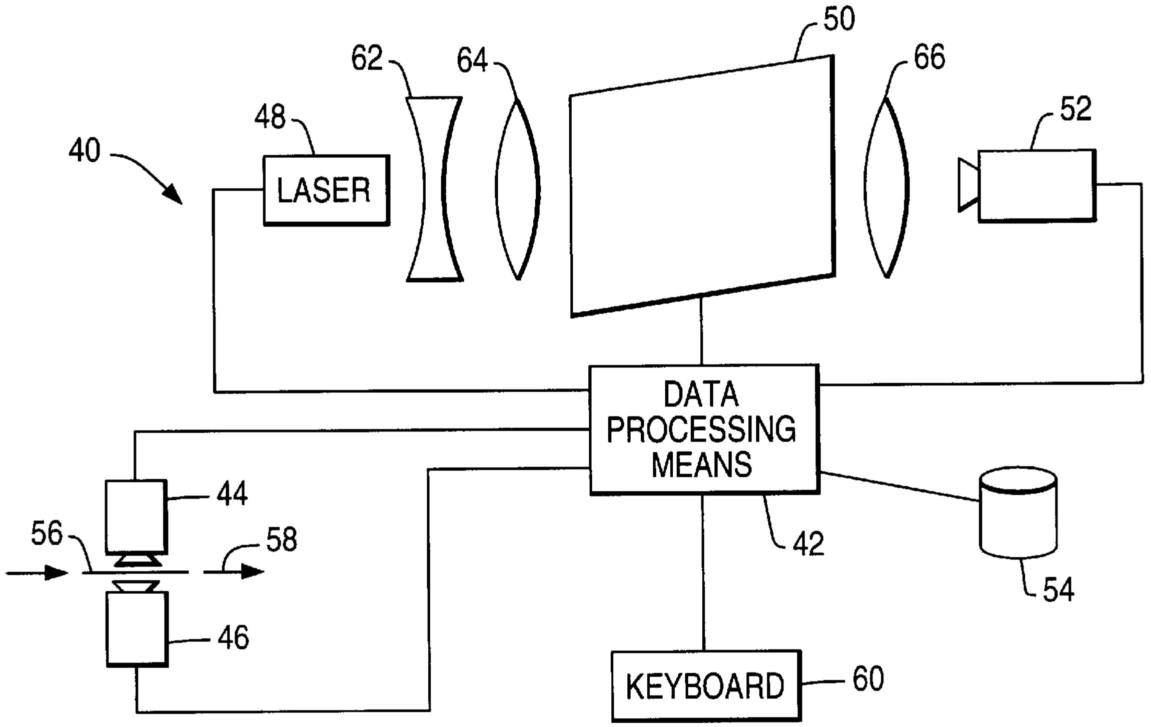
FIG. 3 is a part schematic and part block diagram of a system for forming a reference from a bank note that is later to be used in the system for recognizing different denominations of notes in accordance with the invention.

Referring to FIG. 3, a recording system 40 for forming references for different denominations of bank notes is shown. The system 40 includes a data processing means 42 to which are connected a pair of digital cameras 44,46, a laser 48, a spatial light modulator 50, a third digital camera 52 and a storage device 54. Conventional note transport means (not shown) under the control of the data processing means 42 are used to transport a single example of each denomination of bank note 56 along a feed path as indicated by arrows 58. A keyboard 60 is also connected to the data processing means 42.

The value of a first denomination of bank note is entered via the keyboard 60. The note 56 is then transported between the pair of digital cameras 44,46 as shown by arrows 58. These digital cameras 44,46 are called contact cameras. They are known and are similar to conventional hand-held scanners. The cameras 44,46 have to be wide enough to scan a whole note as the note is passed between them, and they are mounted so as to be perpendicular to the feed path 58. The image of each side of the note scanned by cameras 44,46 are stored in the data processing means 42.

An optical image of the side of the note scanned by camera 44 is displayed on the spatial light modulator 50. Light from the laser 48 passes via a conventional arrangement of an expander lens 62 and a correlation lens 64 and through the spatial light modulator 50. The arrangement of lenses 62,64 expands the beam of light from the laser 48 so that it passes through the whole optical image displayed on the spatial light modulator 50. Another lens 66 focuses the diffraction pattern resulting from light passing through the spatial light modulator 50 in a plane known as the Fourier Transform plane where the focused diffraction pattern at this plane is known as a Fourier Transform. This analog Fourier Transform contains the amplitude and the phase information (spatial frequencies) associated with the digitized image. The third digital camera 52 is located at the Fourier Transform plane and serves to record a digital image of the Fourier Transform which is then stored, this image being referred to as a matched spatial filter.

The image of the other side of the note as recorded by camera 46 is then displayed on the spatial light modulator 50 and a second matched spatial filter is similarly produced. The pair of matched spatial filters for that denomination are then stored in the storage device 54.

The above process is repeated for all the different denominations of bank notes required so that a there are a stored reference pair of matched spatial filters for every denomination.

Figure 4:
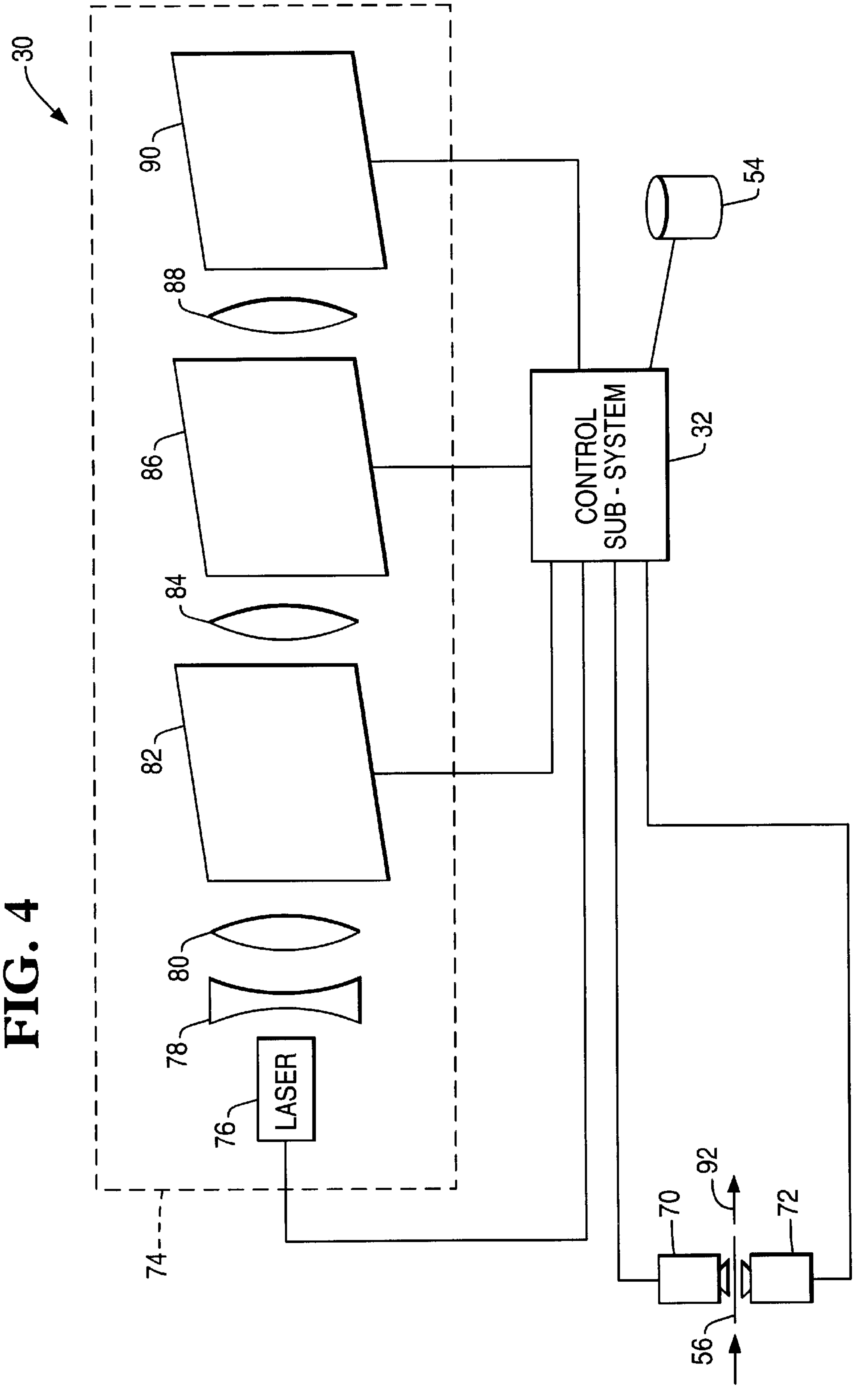
FIG. 4 is a part schematic and part block diagram of the deposit terminal of FIG. 1.

Referring to FIG. 4, the control sub-system 30 is connected to a pair of contact digital cameras 70,72, a Vander Lugt optical correlator 74 and the storage device 54 of FIG. 3. The correlator 74 comprises a laser 76, an expander lens 78, a correlation lens 80, a first spatial light modulator 82, a third lens 84, a second spatial light modulator 86, a fourth lens 88 and a charge-coupled device (CCD) light sensor 90 spaced along an axis as illustrated.

Arrows 92 indicate the path taken by the separated notes through the denomination recognition system 30 where notes are transported by note transport means 28 (see FIG. 2). Each note 56 is transported between the pair of contact digital cameras 70,72 where these cameras 70,72 are of the same type as those used in the recording system 40 (see FIG. 2). The cameras 70,72 scan an image of each side of the note 56 where these images are stored in the control sub-system 32. An optical image of the side of the note scanned by camera 70 is displayed on the first spatial light modulator 82 contained within the Vander Lugt correlator 74. Light from the laser 76 passes via lenses 78,80, which act in the same way as the expander lens 62 and correlation lens 64 of the recording system 40, and through the first spatial light modulator 82. By means of the third lens 84 an analog Fourier Transform of the image is produced at the Fourier Transform plane, where the second spatial light modulator 86 is located.

The control sub-system 32 retrieves from the storage device 54 one of the pair of digital matched spatial filters of a first denomination and this is displayed on the second spatial light modulator 86 as an optical image.

If the Fourier Transform of the side of the note scanned by camera 70 is identical to the matched spatial filter displayed on the second spatial light modulator 86 then a correlation dot is produced at the correlation plane of the correlator 74. Located at the correlation plane is the CCD light sensor 90. This detects whether a correlation dot is produced.

If a dot is produced, then the image of the side of the note scanned by camera 72 is displayed on the first spatial light modulator 82 and the other one of the pair of matched spatial filters is displayed on the second spatial light modulator 86 to produce a dot on the CCD light sensor 90 to confirm that the denomination is recognized.

If, on the other hand, the Fourier Transform produced at the second spatial light modulator 86 is not the same as the retrieved matched spatial filter, then no correlation dot is produced and the other one of the pair of matched spatial filters is displayed on the second spatial light modulator 86. If a correlation dot is produced then the image of the side of the note scanned by camera 72 is displayed on the first spatial light modulator 82 and first of the pair of matched spatial filters is again displayed on the second spatial light modulator 86 to confirm that the denomination is recognized.

If the first pair of matched spatial filters fail to produce a correlation dot, then the pair of matched spatial filters associated with the next denomination are accessed from the storage device 54. This process is continued until either a correlation dot is produced for both sides of the note 56 for a particular denomination or until all the filters for all the denominations are tried. If the latter is the case then the note 56 is rejected.

The storage device 54 is a remote database of the financial institution that owns the self-service deposit terminal 10 where a network of these terminals are all connected to the same database. An alternative is for the sets of matched spatial filters of all the denominations to be separately stored in each terminal 10.

The digital cameras 44,46 and 52 used in the recording system 40 and the digital cameras 70,72 in the self-service deposit terminal 10 must be of a very high resolution.

The advantage of the bank note denomination recognition system according to the invention over known denomination recognition systems is its improved speed. This is due to the system detecting whether there is a correlation dot or not as opposed to directly comparing a scanned image with a stored image of a bank note, which is computationally intensive.

Since different denominations of bank notes can be recognized a reference table can be accessed by the terminal 10 where the correct monetary value is assigned to each denomination of bank note recognized. By using this table the terminal 10 can add up the total value of the deposit made by the user and print this value on the acknowledgment receipt presented to the user via slot 24.

This bank note denomination recognition system 30 can also be incorporated into a note sorter where notes are separated into piles of different denominations after having been individually passed through the system 30.

What is claimed is:

1. A system for recognizing a sheet comprising:

Scanning means for scanning an image of a sheet;

storage means for storing a reference relating to the image of the sheet to be recognized, the reference comprising at least one matched spatial filter;

comparing means for comparing the sheet with the stored reference; and means for producing a diffraction pattern from the image of the sheet, the comparing means comparing the diffraction pattern with the at least one stored matched spatial filter.

2. A system according to claim 1, where the storage means stores a plurality of matched spatial filers to allow a plurality of different diffraction patterns to be recognized.

3. A system according to claim 1, wherein the comparing means compares the diffraction pattern with the matched spatial filter by correlation.

4. A system according to claim 3, wherein the comparing means includes a light sensitive matrix for detecting a correlation dot which is produced when the diffraction pattern and the matched spatial filter match.

5. A system according to claim 4, wherein the comparing means includes a Vander Lugt optical correlator.

6. A system according to claim 2, where the storage means stores a first matched spatial filter for a first image of a first side of the sheet and a second matched spatial filter for a second image of a second side of the sheet.

7. A system according to claim 1, wherein the at least one matched spatial filter relates to are least one bank note denomination.

8. A bank note handling machine comprising:

scanning means for scanning a bank note image;

storage means for storing a reference relating to an image of at least one bank note denomination to be recognized, the reference comprising at least one matched spatial filter;

comparing means for comparing the bank note image with the stored reference; and means for producing a diffraction pattern from the bank note image;

the comparing means comparing the diffraction pattern with the at least one stored matched spatial filter.

9. A bank note handling machine according to claim 8, wherein the storage means stores a plurality of matched spatial filters to allow a plurality of different diffraction patterns to be recognized.

10. A bank note handling machine according to claim 9, where the storage means a first matched spatial filter for a first image of a first side of the bank note and a second matched spatial filter for a second image of a second side of the bank note.

11. A bank note handling machine according to claim 8, wherein the comparing means compares the diffraction pattern with the matched spatial filter by correlation.

12. A bank note handling machine according to claim 11, wherein the comparing means includes a light sensitive matrix for detecting a correlation dot which is produced when the diffraction pattern and the matched spatial filter match.

13. A bank note handling machine according to claim 12, wherein the comparing means includes a Vander Lugt optical correlator.

14. A recording system for producing matched spatial filters for use in a system for recognizing different types of sheets, the recording system comprising:

first scanning means for scanning at least one side of a sheet;

a spatial light modulator for providing an optical image of the scanned side of the sheet;

light means for passing light through the spatial light modulator;

focusing means for producing a diffraction pattern of the displayed on the spatial light modulator; and second scanning means for recording a matched spatial filter derived from the diffraction pattern.

15. A recording system according to claim 14, further comprising another focusing means enabling light from the light means to pass through a whole image displayed on the spatial light modulator.

* * * * *

UNITED STATES PATENT AND TRADEMARK OFFICE
CERTIFICATE OF CORRECTION

PATENT NO. : 6,449,032 B1 Page 1 of 1
DATED : September 10, 2002
INVENTOR(S) : Alexander W. Whytock It is certified that error appears in the above-identified patent and that said Letters Patent is hereby corrected as shown below:

Column 4,
Line 40, delete "where" and insert -- wherein --.
Line 41, delete "filers" and insert -- filters --.
Line 57, delete "are" and insert -- at --.

Signed and Sealed this

Eighteenth Day of March, 2003

JAMES E. ROGAN
*Director of the United States Patent and Trademark Office*